Patented June 13, 1933

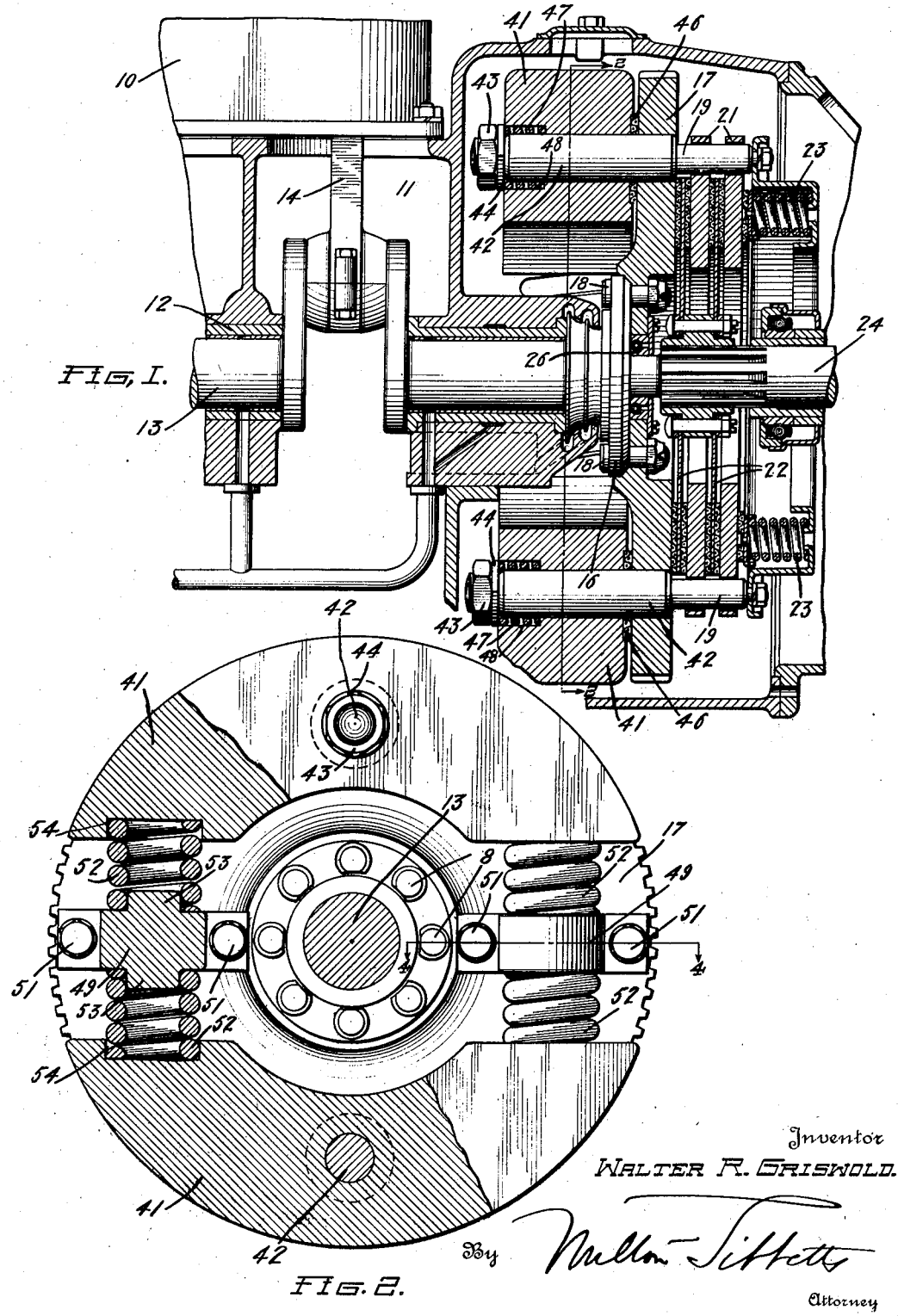

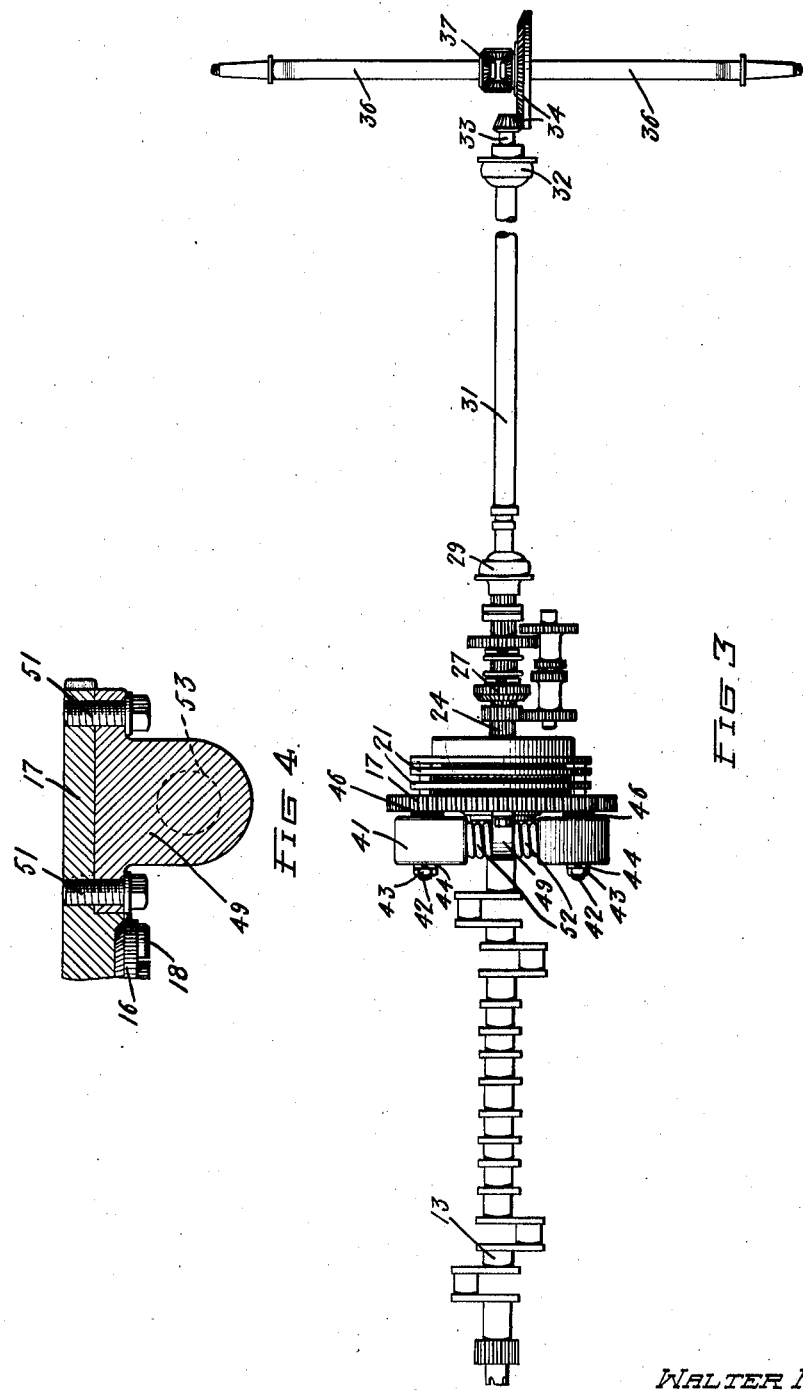

1,913,803

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 30, 1928. Serial No. 266,079.

This invention relates to motor vehicles and the power generation and transmission systems thereof, and more particularly it relates to the prevention of vibratory disturbances in such power systems.

It has for one of its objects to provide means whereby some of the vibratory disturbance in the power system may be avoided, and any remaining vibration effectively damped.

Another object of the invention is to provide means to shift the critical speeds of a given crank shaft to a position with respect to the engine speed range in which they may be readily damped.

Another object of the invention is to provide means in the power system of a motor vehicle adapted to damp vibration in both the driving and driven parts of said system.

Another object of the invention is to provide a combined clutch, flywheel and vibration damper for motor vehicles.

Other objects of the invention will appear from the following descriptiotn taken in connection with the drawings, which form a part of this specification, and in which:

Fig. 1 is a view, partially in elevation and partially in longitudinal section, through part of the engine and transmission system of a motor vehicle, illustrating the application of the invention thereto;

Fig. 2 is a view of the device shown in Fig. 1, partially in elevation and partially in transverse section substantially on the line 2—2 of Fig. 1;

Fig. 3 is a diagrammatic representation of the engine crank shaft, and the associated transmission mechanism of a motor vehicle, constructed in accordance with this invention, and Fig. 4 is a detail section substantially on the line 4—4 of Fig. 2.

In motor vehicles as now commonly constructed, there is a prime mover, usually an internal combustion engine having a crank shaft and flywheel, connected by a suitable clutch to propelling mechanism including transmission gearing and associated shafts, by which the torque of the engine is applied to the driving wheels of the vehicle. Both the driving mechanism, including the crank shaft and flywheel, and the driven mechanism, including the transmission gearing, propeller shaft and axles, constitute torsionally elastic systems which may vibrate under certain conditions in accordance with the well known laws of vibration.

The driving system is subjected to periodic impressed forces from the pressure of the pistons and from the inertia of the reciprocating parts, which results in vibration periods at certain critical speeds as is well known. A crank shaft may vibrate in several degrees, the degree referring to the number of nodes in the elastic curve of the shaft, and it may also have several orders of vibration in each degree, depending on the number of complete vibrations per revolution of the shaft. Thus the critical speeds are defined by two factors, the degree and the order. In most engines the second degree vibrations have rather high frequencies, so that they usually come in above the normal engine speed range. On the other hand, the first degree vibrations are largely within the engine range and are of orders having large amplitudes.

The present invention contemplates a shifting of the range of critical speeds with respect to the engine speed range, by which they are lowered in such a way that the first degree critical speeds may be readily damped, while the second degree speeds are not brought to any extent within the normal operating range of the engine. This shifting of the critical speeds results in lowering the frequency of the vibration, and as the energy of vibration which must be dissipated by damping is proportional to the square of the frequency, the advantage of so shifting the position of the critical speeds will be apparent. Such a shift in position of the critical speeds may be conveniently effected by increasing the elasticity of the driving system, as by resiliently mounting a portion of its mass, and the present invention provides means to secure this effect, together with adequate friction damping means for the system.

The driven system of the vehicle, including the transmission gearing, propeller shaft, final reduction gearing and axle shafts, is connected to the driving system through the clutch. During the forward driving of the vehicle the torque transmitted fluctuates somewhat but is always positive. However, when the vehicle is allowed to coast down against the engine, there is no power torque, but there is a large fluctuating inertia torque in the crank shaft, which is alternately positive and negative, and which constitutes a periodic force applied to the transmission and propeller shaft through the clutch. When this force is in synchronism with any of the natural periods of the driven system, a more or less violent torsional disturbance occurs therein. This vibration has the effect of alternately taking up and releasing all of the back lash in the transmission gearing and in the clutch, causing a particularly undesirable sensation to occupants of the vehicle. The present invention also provides means whereby such vibration in the driven system is completely damped.

Referring to the drawings, at 10 is shown a part of an internal combustion engine having a crank case 11 provided with transverse webs in which are supported bearings 12. A crank shaft 13 is journaled in the bearings 12 and driven by connecting rods 14 from pistons in the engine cylinders (not shown). The rear end of the crank shaft 13 is provided with an integral flange 16 to which a disk or web 17 is secured in any convenient manner as by bolts 18. The web 17 has considerable inertia and forms part of the flywheel element of the engine. It is adapted to drive one member of the vehicle clutch, and it also supports the vibration damping means of this invention.

For driving purposes the web is provided with axially projecting pins 19 on which are mounted the driving elements or plates 21 of a friction clutch of conventional construction. Disposed between the driving plates 21 are driven plates 22, preferably provided with suitable friction facing, and these driving and driven plates are urged axially into engagement by suitable clutch engaging means such as springs 23. The clutch is provided with the usual disengaging or throw-out mechanism which is not illustrated in detail, but which operates to separate the driving and driven plates against the springs 23 in the well known manner.

Splined or otherwise secured to the driven plates 22 is a clutch shaft 24, supported in suitable bearings, one of which is shown at 26 at the rear end of the crank shaft 13, which clutch shaft is connected to and adapted to drive vehicle transmission mechanism of any suitable form. As shown in Fig. 3 this transmission mechanism includes conventional change-speed gearing 27, connected by a universal joint indicated at 29 to a vehicle propeller shaft 31. The rear end of the propeller shaft 31 is connected through another universal joint 32 and a pinion shaft 33 to the final reduction gearing 34, preferably of the usual bevel pinion and ring gear type, and this gearing 34 is adapted to drive a pair of axle shafts 36 through the differential gearing 37. The outer end of the axle shafts 36 are connected to and adapted to drive the vehicle wheels in the well known manner.

It will be observed that this driving mechanism comprises two elastic systems, the engine crank shaft and its associated flywheel element, and the transmission mechanism, which systems are connected by the clutch. Each of these systems alone has its own vibratory characteristics and each is subjected to impressed forces of a periodic nature, which tend to set up induced vibrations when in synchronism with the natural frequency at the various critical speeds. The present invention provides means to damp out and prevent the resonant growth of such induced vibration in either and both of the elastic systems.

The damping means of this invention is in the form of opposed or complementary inertia or weight members 41 of equal mass, preferably arcuate in form, which are carried by the web member 17 and pivotally movable thereon. To support these members, the web member 17 is provided with axially disposed pins 42, rigidly secured in and projecting from its forward face. These pins 42 may be integral with the clutch pins 19 as shown, if desired, or they may be separately formed, and they may be arranged at any desired radius from the crank shaft axis. One of the inertia members 41 is pivotally mounted on each of the pins 42, its center of gravity being offset from the pivotal axis, so that there is a considerable inertia moment tending to oscillate the member about its pin.

Each of the members 41 is retained on its pin 42 in any convenient manner, as by a nut 43 and washer 44 at the outer end thereof, and is spaced from the face of the web 17 by a friction member or disk 46. Means is provided by which each of these inertia members is urged into contact with the friction disk 46 and this means is shown as a compression spring 47, seated in a recess or counterbore 48 in the member 41, and bearing at its outer end against the washer 44. It will thus be apparent that pivotal movement of the members 41 on the pins 42 is resisted by considerable friction with the disks 46 and this is the principal damping friction of the device. Further damping friction occurs at the bearing of the member 41 on the pin 42.

The forwardly disposed face of the web 17 is provided, intermediate the adjacent ends of the arcuate inertia members 41, with brackets 49 which are secured to the web in any convenient manner as by the bolts or screws 51, and which form an abutment for the springs of the device.

There is a pair of these springs 52 for each of the inertia members 41, and these are of equal strength and are disposed at equal distances from the pin 42, so that they exert equal and opposite moments tending to turn the inertia member about its pivotal axis. Any such pivotal movement is effected against one or the other of these springs, which thus act to return it to its normal or neutral position after any oscillatory displacement therefrom. The pairs of springs for the two inertia members act in opposite directions, as clearly shown in Fig. 2, and the inner ends of the corresponding springs of each pair are supported on opposite sides or faces of the brackets 49, which are provided with raised portions 53 forming positioning seats. The outer ends of the springs are seated in suitable recesses 54 in the inertia members.

The operation of the device herein disclosed will be readily understood. At the lower engine speeds, there is sufficient friction between the inertia members and the disks 46 to prevent displacement of the inertia members on their pivots, so that the whole device acts as a flywheel of considerable mass, thus insuring smooth engine operation.

At some of the higher speeds the inertia forces are sufficient to overcome the friction between the members 41 and the disks 46, so that a portion of the flywheel effect is removed, and at the same time a portion of the mass of the system becomes elastically connected thereto. As previously pointed out, this increase in the elasticity of the system acts to lower the position in the engine speed range at which the various critical speeds occur, and this applies to both the first degree and the second degree critical speeds. As the first degree critical speeds are lowered in the engine speed range, the frequency of the resulting vibrations is considerably reduced, and as ample damping friction is provided at the disks 46, these disturbances may be easily damped.

The second degree critical speeds usually occur at speeds above the normal operating range of the engine, and these are also lowered. However, by choosing springs 52 having the proper characteristics with relation to the inertia masses 41, these critical speeds can be for the most part kept above the normal operating engine speed. If any are brought in, they are readily damped by the action of the device as described above.

It will also be apparent that this device is adapted to damp vibrations, such as those caused by the well known inertia torque, set up in the driven portion of the system. Such vibrations tend to superpose on the motion of the shaft 24 a rapid oscillatory motion which takes up in alternate directions all the back lash in the transmission gears, the clutch splines and the other driven elements.

Such vibration, therefore, tends to impose this same oscillatory motion on the web 17 through the clutch, thus causing pivotal movement of the weight members 41 and resulting in the frictional damping of the disturbance.

It will be seen that in this manner the invention provides a combined clutch, flywheel and vibration damper for the power system of a motor vehicle, which is simple and relatively inexpensive in construction, which is adapted to avoid a part of the vibratory disturbances in the power system, and to effectively damp any remaining disturbance occurring in either portion of the power system.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. The combination in a power device including two elastic systems coupled for rotation, of inertia means, means supporting said inertia means for movement with respect to the device, said inertia means being elastically connected to the device and operable to change the vibratory characteristics of one of said systems, and friction means associated with said inertia means for resisting movement of the latter to damp vibrations in both systems, said friction means having sufficient resistance to prevent movement of said inertia means at relatively low speeds of rotation of the systems.

2. The combination with an internal combustion engine having a crank shaft, of a transmission shaft, a clutch having torque transmitting pins adapted to connect said shafts, a vibration damper for said shafts including inertia members movably mounted on certain of said pins, and means for resisting movement of said inertia members.

3. The combination in an internal combustion engine having a crank shaft, of a flywheel for said shaft comprising oppositely disposed weight members, means for mounting said weight members on said shaft for pivotal movement with respect thereto, resilient means associated with said weight members for resisting pivotal movement thereof in either direction, and means acting between the shaft and the weight members to effect locking of the latter at low rotational speeds.

4. The combination in a power system including connected driving and driven shafts adapted to operate through a speed range having several critical speeds, of a damping device adapted to change the vibratory characteristics of the system to avoid some of the critical speeds and to damp vibration in both shafts at the other critical speeds, said device comprising an inertia member, means for movably mounting said inertia member on one of the shafts, means for elastically connecting the inertia means to the said shaft to resiliently oppose such movement, and a friction device between said inertia member and its shaft developing sufficient resistance to prevent movement therebetween at the lower shaft speeds.

5. The combination in a motor vehicle having propelling mechanism and a prime mover therefor including a crankshaft, of inertia means means supporting said inertia means for movement with respect to the crankshaft in response to oscillatory disturbances in said crankshaft, yielding means acting between said inertia means and said crankshaft for elastically resisting relative movement therebetween, and friction means between said inertia means and said crankshaft, said friction means exerting sufficient resistance to prevent relative movement of the inertia member and crankshaft at low speeds and until a predetermined speed is exceeded.

6. The combination in a motor vehicle having propelling mechanism and a prime mover therefor including a crankshaft, of inertia means located intermediate said crankshaft and propelling mechanism, means supporting said inertia means for movement with respect to the crankshaft in response to oscillatory disturbances in said crankshaft and propelling mechanism, yielding means acting between said inertia means and said crankshaft for elastically resisting relative movement therebetween, and friction means between said inertia means and said crankshaft, said friction means exerting sufficient resistance to prevent relative movement of the inertia member and crankshaft at low speeds and until a predetermined speed is exceeded.

7. The combination of a motor vehicle having a driving system including an engine crankshaft and a driven system including transmission gearing and a propeller shaft, of inertia means, means supporting said inertia means for movement with respect to the crankshaft in response to vibratory disturbances therein, means acting between said crankshaft and said inertia means to elastically resist relative movement thereof, and friction means acting between said crankshaft and said inertia means for resisting relative movement thereof to damp vibration in either system.

8. In an internal combustion engine including an elastic crankshaft system subjected to severe torsional vibrations when operating at predetermined critical speeds at which the frequency of the torque impulses applied to the crankshaft are co-ordinated with the natural frequencies of vibration of the crankshaft system, the combination with an inertia mass, means for supporting said mass on the crankshaft system for movement with respect thereto in response to torsional vibrations induced in the system, said supporting means including an elastic connection between said mass and system yieldably resisting relative movement thereof, and means acting between said system and mass for preventing relative movement thereof at crankshaft speeds lower than a predetermined speed only, whereby said mass and system are elastically connected when the predetermined speed is reached to lower the critical speeds of the system.

9. In an internal combustion engine including an elastic crankshaft system subjected to severe torsional vibrations when operating at predetermined critical speeds at which the frequency of the torque impulses applied to the crankshaft are co-ordinated with the natural frequencies of vibration of the crankshaft system, the combination with an inertia mass, means for supporting said mass on the crankshaft system for movement with respect thereto in response to torsional vibrations induced in the system, said supporting means including an elastic connection between said mass and system yieldably resisting relative movement thereof, and means comprising a friction connection between said system and mass having sufficient resistance to prevent relative movement of said system and mass at speeds remote from the critical speeds.

10. In an internal combustion engine, the combination with a flywheel comprising oppositely disposed weight members of equal mass, supporting means for said weight members including a pivot bearing for each of said members, oppositely disposed resilient means acting between said supporting means and said weight members to oppose motion of the members on said pivot bearings in either direction, and means acting between said supporting means and said weight members to prevent movement of said weight members on the bearings at relatively low engine speeds.

11. The combination in an internal combustion engine having a crankshaft, of a flywheel for said shaft comprising a web portion rigidly secured thereto, inertia members, said web portion having journals for supporting said inertia members for oscillatory movement with respect thereto in response to vibrational disturbances in the crankshaft, and oppositely acting spring means associated with each member and said web portion to produce sufficient friction at said journals to prevent oscillatory movement of said inertia members at low rotational speeds and to retard oscillatory movement of said inertia members at higher speeds.

In testimony whereof I affix my signature.

WALTER R. GRISWOLD.